(12) United States Patent
Ashour et al.

(10) Patent No.: US 10,417,501 B2
(45) Date of Patent: Sep. 17, 2019

(54) OBJECT RECOGNITION IN VIDEO

(71) Applicant: International Business Machines Corporation, Armonk, NY (US)

(72) Inventors: Gal Ashour, Yoqneam (IL); Yevgeny Burshtein, Nesher (IL); Tal Hakim, Haifa (IL); Dror Porat, Haifa (IL); Daniel Nechemia Rotman, Karmiel (IL)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 15/832,881

(22) Filed: Dec. 6, 2017

(65) Prior Publication Data

US 2019/0171886 A1  Jun. 6, 2019

(51) Int. Cl.
*G06K 9/00* (2006.01)
*G06K 9/62* (2006.01)

(52) U.S. Cl.
CPC ..... *G06K 9/00765* (2013.01); *G06K 9/00718* (2013.01); *G06K 9/6215* (2013.01); *G06K 9/6261* (2013.01); *G06K 9/6262* (2013.01); *G06K 2209/27* (2013.01)

(58) Field of Classification Search
None
See application file for complete search history.

(56) References Cited

U.S. PATENT DOCUMENTS

| 7,499,591 | B2 * | 3/2009 | Simske | G06F 16/35 382/224 |
| 8,620,078 | B1 * | 12/2013 | Chapleau | G06K 9/344 382/173 |
| 8,761,510 | B2 | 6/2014 | Russakovsky et al. | |
| 8,965,115 | B1 * | 2/2015 | Khosla | G06K 9/00664 382/103 |
| 9,436,876 | B1 * | 9/2016 | Carlson | G06K 9/6224 |

(Continued)

OTHER PUBLICATIONS

Demirkus et al., "Gender Classification from Unconstrained Video Sequences", 2010 IEEE Computer Society Conference on Computer Vision and Pattern Recognition—Workshops, 2010, pp. 55-62.
(Continued)

*Primary Examiner* — Fayyaz Alam
(74) *Attorney, Agent, or Firm* — Dvir Gassner (57) ABSTRACT

A system comprising a non-transient computer-readable storage medium having stored thereon instructions and at least one hardware processor configured to execute the instructions, to receive a video sequence; divide the video sequence into one or more scenes based on scene boundaries, wherein each scene comprises a plurality of temporally-contiguous image frames, and wherein said scene boundaries are being determined based on a similarity metric between two temporally-contiguous image frames meeting a dissimilarity threshold; and, for each scene of the one or more scenes, (i) generate a plurality of preliminary classifications of an object appearing in at least some of said image frames in the scene, wherein each of said plurality of preliminary classifications has a confidence score, and (ii) calculate a combined classification of the object based on said plurality of preliminary classifications, wherein each of said preliminary classifications is weighted in accordance with its confidence score.

20 Claims, 7 Drawing Sheets

(56) References Cited

U.S. PATENT DOCUMENTS

| | | |
|---|---|---|
| 9,607,224 B2 | 3/2017 | Tsai et al. |
| 9,659,238 B2 | 5/2017 | Brown et al. |
| 2007/0058836 A1* | 3/2007 | Boregowda ......... G06K 9/00771 382/103 |
| 2009/0244291 A1* | 10/2009 | Saptharishi ........ G06K 9/00771 348/187 |
| 2011/0293136 A1* | 12/2011 | Porikli ............... G06K 9/00771 382/103 |
| 2013/0156304 A1 | 6/2013 | Moorty et al. |
| 2015/0139538 A1* | 5/2015 | Lin .................... G06K 9/00234 382/159 |
| 2016/0063357 A1* | 3/2016 | Gao .................... G06K 9/4604 382/159 |
| 2017/0185846 A1 | 6/2017 | Hwangbo et al. |
| 2017/0270653 A1* | 9/2017 | Gamavi ................. G06T 7/0002 |
| 2018/0157939 A1* | 6/2018 | Butt ................... G06K 9/00771 |
| 2018/0204061 A1* | 7/2018 | Antol ................. G06F 11/3433 |
| 2018/0285767 A1* | 10/2018 | Chew ................. H04L 67/1097 |

OTHER PUBLICATIONS

Hua et al., "Efficient video text recognition using multiple frame integration", Proceedings. International Conference on Image Processing, Sep. 2002, pp. 397-400, vol. 2.

Li et al., "Text enhancement in digital video using multiple frame integration", Proceeding Multimedia '99 Proceedings of the seventh ACM international conference on Multimedia (Part 1), 1999, pp. 19-22.

Cooper et al., "Video Segmentation via Temporal Pattern Classification", IEEE Transactions on Multimedia, Apr. 2007, pp. 610-618, vol. 9, Issue 3.

Li et al., "Dynamic Pooling for Complex Event Recognition", 2013 IEEE International Conference on Computer Vision, 2013, pp. 2728-2735.

* cited by examiner

OBJECT RECOGNITION IN VIDEO

BACKGROUND

The present invention relates to the field of visual recognition and classification of objects in video.

The field of computer object recognition is concerned with finding and identifying objects in an image or video sequence. Humans are capable of recognizing a multitude of objects in images quickly and accurately, and regardless of variations in, e.g., viewpoint, size, scale, and orientation. Objects can even be recognized by humans when they are partially obstructed from view. However, this task continues to be challenging for computer vision systems, and even more so when it comes to object recognition in moving visual media. Current object classification systems face difficulties in handling arbitrary camera angles and zooms, varying poses, occlusions, illumination conditions, and strong shadow effects, which may cause variations in object appearance, shape, and size.

Over the past several decades, many different approaches have been proposed to automatically classify objects in images and videos. However, these approaches often require large amounts of training data to learn robust classifiers, and typically suffer from object-pose variability. As a result, state-of-the-art visual classifiers include a high level of uncertainty.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a system comprising non-transient computer-readable storage medium having stored thereon instructions, and at least one hardware processor configured to execute the instructions, to receive a video sequence; divide the video sequence into one or more scenes based on scene boundaries, wherein each scene comprises a plurality of temporally-contiguous image frames, and wherein said scene boundaries are being determined based on a similarity metric between two temporally-contiguous image frames meeting a dissimilarity threshold; and for each scene of the one or more scenes (i) generate a plurality of preliminary classifications of an object appearing in at least some of said image frames in the scene, wherein each of said plurality of preliminary classifications has a confidence score, and (ii) calculate a combined classification of the object based on said plurality of preliminary classifications, wherein each of said preliminary classifications is weighted in accordance with its confidence score.

There is also provided, in accordance with an embodiment, a computer program product, the computer program product comprising a non-transitory computer-readable storage medium having program code embodied therewith, the program code executable by at least one hardware processor to: receive a video sequence; divide the video sequence into one or more scenes based on scene boundaries, wherein each scene comprises a plurality of temporally-contiguous image frames, and wherein said scene boundaries are being determined based on a similarity metric between two temporally-contiguous image frames meeting a dissimilarity threshold; and for each scene of the one or more scenes (i) generate a plurality of preliminary classifications of an object appearing in at least some of said image frames in the scene, wherein each of said plurality of preliminary classifications has a confidence score, and (ii) calculate a combined classification of the object based on said plurality of preliminary classifications, wherein each of said preliminary classifications is weighted in accordance with its confidence score.

In some embodiments, the instructions further comprise iteratively repeating the step of dividing of the video sequence into one or more scenes, wherein in a next iteration, the determining of scene boundaries is based, at least in part, on said combined classification.

In some embodiments, the scene boundaries are being determined, at least in part, based on one or more of: video metadata associated with the video sequence; a time range definition; textual information from the video sequence; audio content associated with the video sequence; and closed-captioning information associated with the video sequence.

In some embodiments, the instructions are further configured to execute facial recognition. In some embodiments, said instructions are further configured to execute Optical Character Recognition (OCR).

In some embodiments, the classifications are executed by a neural network. In some embodiments, the neural network is trained on a set of labelled image data to learn characteristics for each type of object.

There is further provided, according to an embodiment, a system comprising non-transient computer-readable storage medium having stored thereon instructions, and at least one hardware processor configured to execute the instructions, to: receive a video sequence; (i) divide the video sequence into scenes based on scene boundaries, wherein each scene comprises a plurality of temporally-contiguous image frames, and wherein said scene boundaries are being determined based on a distance metric between two temporally-contiguous image frames, with respect to each scene of the scenes (ii) generate a plurality of preliminary classifications of an object appearing in at least some of said image frames in the scene, wherein each of said plurality of preliminary classifications has a confidence score, and (iii) calculate a combined classification of the object based on said plurality of preliminary classifications, wherein each of said preliminary classifications is weighted in accordance with its confidence score; and iteratively repeat steps (i) through (iii), wherein for a next iteration, said dividing is based, at least in part, on said calculated combined classification.

In some embodiments, the scene boundaries are being determined at least in part based on one or more of: video metadata associated with the video sequence; a time range definition; textual information from the video sequence; audio content associated with the video sequence; and closed-captioning information associated with the video sequence.

In some embodiments, the instructions are further configured to execute facial recognition. In some embodiments, the instructions are further configured to execute Optical Character Recognition (OCR).

In some embodiments, the classifications are executed by a neural network. In some embodiments, the neural network is trained on a set of labelled image data to learn characteristics for each type of object.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a system, a method, and a computer program product for context-aware object recognition and classification in a video. Whereas visual classifiers typically are applied on a frame-by-frame basis, the present system leverages temporal segmentation of the video, which can provide a contextual setting for improving classifier results. This is done by averaging classifier results over multiple frames in a scene of the video, on the idea that the visual concepts in individual frames within a semantically-coherent scene will be strongly correlated. Thus, pooling results over multiple classifications may provide a probabilistic increase in the level of confidence in the results.

The present system relies on an initial segmentation of the video into semantically-coherent segments, to improve the probability of correlation among visual concepts in the temporal segment under consideration by the system. Once the object recognition stage has been concluded, the improved results of the object recognition stage may then be used back to fine-tune the segmentation of the video, by suggesting more robust shot and scene boundaries. Thus, there may be performed alternating improvements in an iterative scheme, to arrive at a more accurate classification and segmentation of the video.

The present disclosure may be applied in all domains of video object recognition and classification. In addition, it may be particularly advantageous in specific areas of video object recognition. One such area is facial recognition in unconstrained video sequences in natural scenes, i.e., with variable poses, facial expressions, occlusions, illumination conditions, and motion blur. Pooling results over a clearly-defined temporal segment of the video may increase confidence in the identification. Another area is the problem of Optical Character Recognition (OCR) in video. Compared with OCR in scanned documents, text recognition in digital video presents several challenges. First, the text resolution is often so low that commercial OCR software cannot recognize it reliably. Second, text is often embedded in or superimposed on complex background, so text separation from background is a difficult task. By pooling and averaging results over a correlated temporal segment of the video, a clearer, higher-contrast image may be generated, which may be more suitable for reading by OCR software.

In this disclosure, the term "classification," in the context of machine learning, refers to the classification of observations into a set of categories or classes, on the basis of a training set of data containing instances of observations whose category or class membership is known.

The terms "object recognition" and "object classification" refer to recognition and classification of objects in a digital image using computer vision.

The term "video" refers to any digitally-rendered moving visual media.

The terms "frame" or "image frame" refer to any one of the individual still images which comprise a video.

The term "shot" refers to a sequence of temporally-contiguous frames in a video, taken from the viewpoint of a single camera.

The term "scene" refers to a video subdivision, typically comprising one or more shots. For purposes of this disclosure, a scene will be defined as a sequence of temporally-contiguous semantically-coherent shots depicting a high-level concept, story, or event.

Figure 1:
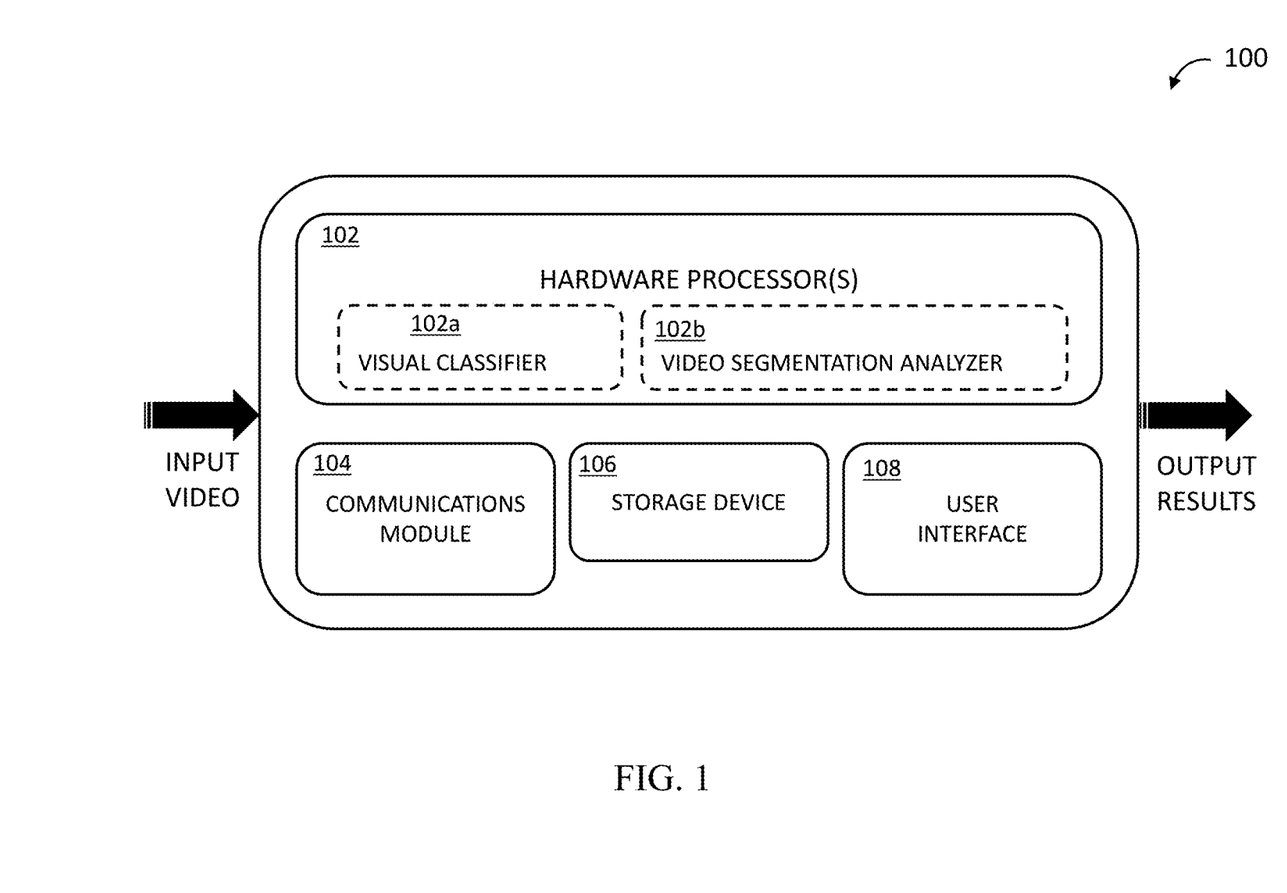
FIG. 1 illustrates an exemplary system for object recognition in video, according to certain embodiments.

An exemplary schematic embodiment of a system 100 according to the present disclosure is illustrated in FIG. 1. It will be appreciated that system 100 may comprise a general-purpose computer, a special-purpose computer, or other programmable data processing apparatus for executing computer readable program instructions. In some variations, system 100 is cloud-based and is accessible through a network, e.g., the Internet. In some embodiments, system 100 comprises one or more hardware processors 102, communicatively connected to a communications module 104, a non-transient computer-readable storage device 106, and a user interface 108. Hardware processor(s) 102 may comprise, e.g., a visual classifier 102a and a video segmentation analyzer 102b. Communications module 106 may connect system 100 to a network, such as the Internet, a local area network, a wide area network and/or a wireless network. User interface 108 may comprise, e.g., a monitor, a keyboard, and/or a mouse. An input video may be uploaded into system 100 by a user. The input video is processed by hardware processor(s) 102, using one or more algorithms stored on storage medium 106. At the conclusion of the processing stage, system 100 may output the results of the processing to the user, e.g., via a monitor of user interface 108.

Figure 2A:
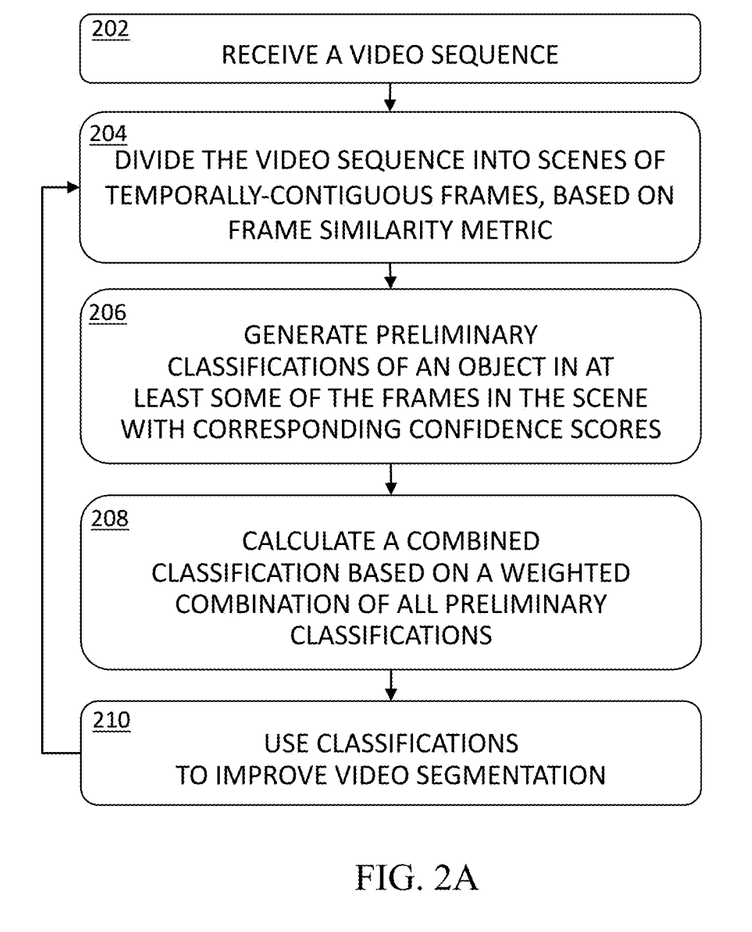
FIG. 2A shows a flowchart illustrating of a method for video object recognition and segmentation, according to certain embodiments.

Reference is now made to FIG. 2A, which is a flowchart illustrating the basic functionality of the system and method, according to certain embodiments of the present disclosure. In some embodiments, in a step 202, the system receives a video sequence. In a step 204, the video sequence data is analyzed, e.g., with reference to FIG. 1, by video segmentation analyzer 102b, and subdivided into shots and semantically-coherent scenes. In some embodiments, the subdivision of the video sequence into segments may be performed in a preprocessing stage, such that the video sequence may be received by the system already subdivided. In yet other embodiments, video segmentation information may be embedded in the digital video, e.g., as video metadata.

It will be appreciated that, when attempting to extract information from a video segment, or deduce the semantics and settings of a video scene, it is usually crucial that the segment or scene under consideration be semantically coherent and uniform. In the absence of textual descriptors or metadata (which require substantial manual preprocessing), the task of video shot and/or scene boundary detection is an important stage of the present system and method. It will be noted that, in addition to being beneficial in the area of object recognition according to the present disclosure, video segmentation technology is a standalone area of technology, used, e.g., for video summarization and as an indexing tool to allow fast browsing and retrieval of a relevant part of a video.

Figure 2B:
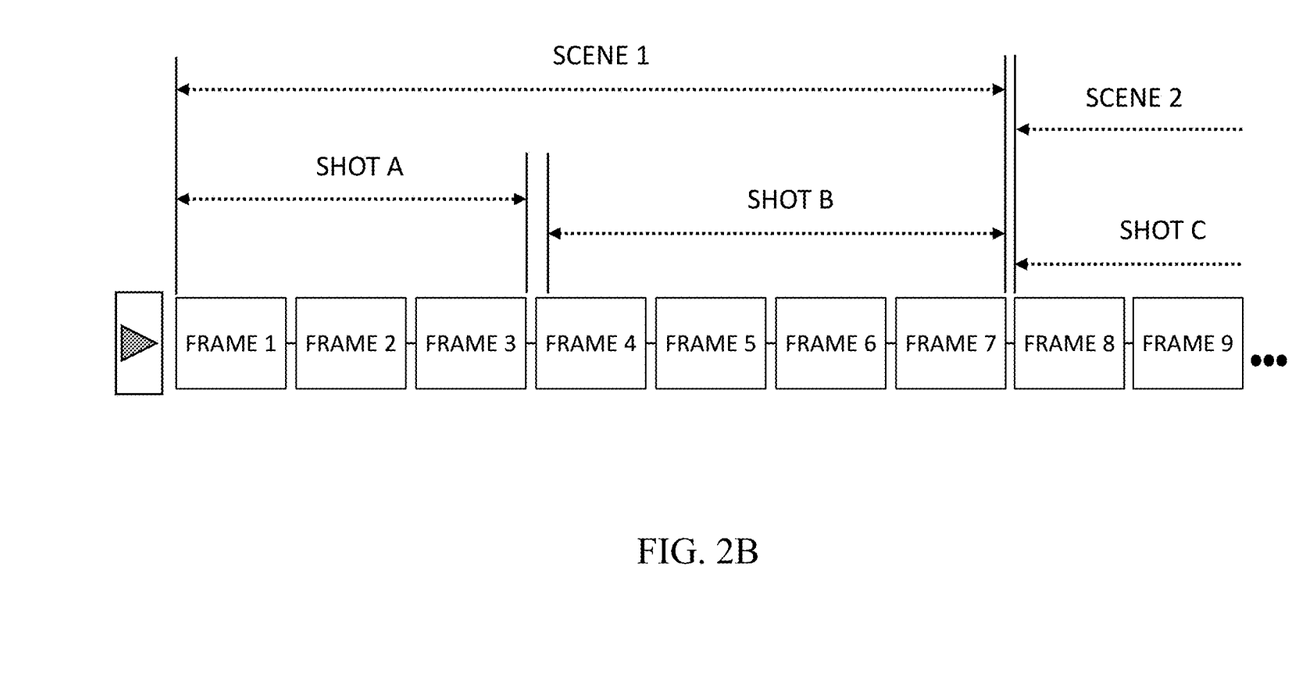
FIG. 2B illustrates an exemplary segmentation of a video sequence, according to certain embodiments.

As shown in FIG. 2B, a video sequence can often be divided at different temporal resolutions, creating a hierarchical decomposition into frames, shots, and scenes. The individual frames, e.g., Frames 1-9, which compose a sequence of a video, are the lowest level of such a division. An uninterrupted sequence of frames taken from the same camera at a specific period of time is then defined as a shot, e.g. Shots A, B, C. A semantic level of division above shots divides a video into scenes, e.g., Scenes 1, 2, which is the goal of many video segmentation processes. The definition of scene may be at times subjective and dependent on artistic or personal perceptions and tastes; however, as a general definition for purposes of this disclosure, a video scene may be viewed as a sequence of semantically-coherent and related, and temporally-contiguous, shots depicting a high-level concept, story, or event.

Shot boundary detection is the task of dividing a video into its constituent shots. When performing scene segmentation, shot boundary detection can be utilized as a preliminary step. Due to the objective definition of a shot and the expected uniformity of the frames in a shot, it is typically considered a solved problem. Various effective methods for shot boundary detection exist. For example, one notable method uses feature matching to measure a distance metric between frames, denoting a boundary where the distance metric between contiguous frames, e.g., exceeds a predetermined threshold. It should be noted that, although shots are typically the building blocks of scenes, sometimes the opposite is true, and a single shot may comprise multiple conceptual scenes. For example, home videos from hand-held cameras may comprise of a single long shot without breaks. For these cases, since precise scene transitions are highly ambiguous, it is sufficient to simply denote shot boundaries on predetermined temporal intervals (e.g., every few seconds) and proceed with scene detection as needed.

Once shot boundaries have been detected, an optional next step may comprise grouping those shots into coherent scenes. However, it will be appreciated that the present system and method can rely solely on shot-level segmentation, without grouping into scene-level segments. Scene-level grouping of shots may be done in several different ways, e.g., based on several available algorithms, or based on manually-annotated metadata embedded in the video.

With reference again to FIG. 2A, in a step 206, the system applies visual classification to individual frames in a scene of the video, to identify objects therein and generate a set of preliminary classifications thereof, wherein each preliminary classification is assigned a confidence score. In a non-limiting example, an IBM® WATSON® visual recognition (VR) application may be used as the visual classifier. However, other object recognition techniques may be considered, such as You Only Look Once (YOLO), or other general methods which utilize techniques such as region-based convolutional neural networks (R-CNN) or deformable part models (DPM).

The WATSON® VR application uses deep learning algorithms to analyze images for scenes, objects, faces, and other content. The output includes keywords or 'tags' that provide information about the identified objects. The VR application may comprise thousands of potential 'tags,' organized into categories and subcategories. For example, categories may include animals (with subcategories such as birds, reptiles, amphibians, etc.); people-oriented information and activities; food; plants (including subcategories such as trees, shrubs, aquatic plants, vegetables); sports; nature (including many types of natural formations, geological structures); and many more.

The VR application may classify responses within a hierarchy of related classes. For example, a picture of a dog might be classified as "animal," as well as a "dog," as well as under the relevant breed, etc. A positive match with classes down the hierarchy scale may boost the score or confidence level of the parent category classification. In this example, the response includes all three classes: "animal," "dog," and the relevant breed. The score of the parent category ("animal") is boosted because it matches the related subclasses ("dog" and the breed).

A VR application classifier in a given category or domain may be created by training the VR application using multiple images of items in the relevant subcategories in that domain. For example, to create a classifier called "fruits," a user may upload multiple images of pears, apples, and bananas during training. The user may also provide 'negative' examples in the same training call, to further hone the classifier training. Negative example for the classifier "fruits" may include, e.g., images of vegetables. The VR application uses the three sets of positive class pictures—apples, bananas, and pears— to train three models internally. For the apples model, the group of pictures in "apples" is trained as a positive example, and the group of pictures uploaded in "bananas" and "pears" are trained as negative examples. The system then knows that bananas and pears are not apples. Similarly, the other classes are used as negative examples for the bananas and pears models as well. Additionally, all three classes are trained against the 'negative' images for the overall classifier of "fruits." After training completes, when the VR application identifies fruit in an image, it will return the classifier "fruit" as an array containing the relevant subcategories "pear", "apple", or "banana," with their respective confidence scores.

Figure 2C:
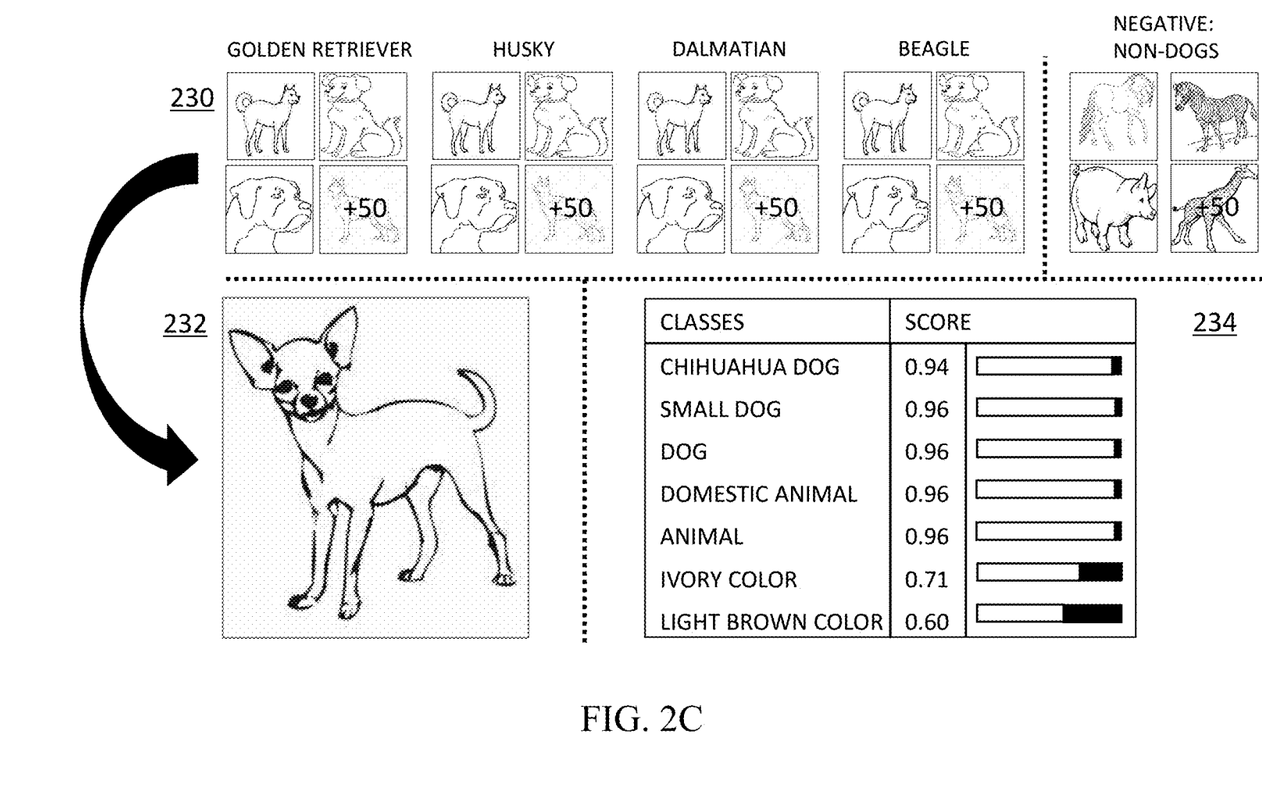
FIG. 2C illustrates an image classification performed by the WATSON® VR application, according to certain embodiments.

FIG. 2C is an illustration of an analysis performed by the WATSON® VR application. In a training step 230, the VR application receives a series of images in a specific class or domain (e.g., dogs). As explained above, the training images may comprise general dog images, image clusters of specific breeds, as well as 'negatives,' i.e., images of animals that are not dogs. The VR application uses deep learning algorithms to analyze the images to establish classifications in this domain. The VR application may then be provided with an image in the trained domain for analyzing, in a runtime step 232. The VR application then outputs in step 234, the 'tags' or classes that are detected within the single image, e.g., the type of animal detected, its size, breed, color, etc. For each class so detected, the VR application provides a confidence score (on a scale of 0-1). As can be seen, the VR application returns, e.g., a very high level of confidence with respect to the type of animal detected, its size and its breed (confidence level in the range of 0.94-0.96). However, the confidence level with respect to recognition of the animal's color is less robust (in the range of 0.60-0.71). The confidence level score may be, e.g., normalized such that a score of 0.5 constitutes a threshold under which results will not be reported.

It will be appreciated that, to ensure a high level of confidence in the results of the VR application, certain training guidelines and conditions need to be met. For example, the images need to be of at least a certain quality and resolution. A minimum number of training images per class is recommended (at least 50, with improvements plateauing at approximately 5,000 images). Advantageously, an equal number of 'positive' and 'negative' training images, as well as images with a variety of setting and backgrounds, should be used.

With reference again to FIG. 2A, within preliminary classification step 206, the system considers a sequence of video frames comprising a shot or a scene. In some variations, the objects may be represented in an unconstrained manner throughout the video sequence, i.e., at any individual frame, the objects can be found at varying viewpoints with respect to the camera, under different lighting conditions, and/or partially occluded, etc. A visual classifier, such as the VR application, may first conduct feature-level detection, to detect and localize objects in each frame, and acquire a set of features from the objects. The VR application may then perform decision-level classification, e.g., assign classifications to the detected features, based the training of the VR application in the relevant domain.

The system may then calculate, in a step 208, a combined classification comprising all preliminary classifications of an object in the shot or scene under consideration. This is done based on the assumption that the visual concepts in individual frames comprising a single shot or conceptually-coherent scene will be strongly correlated. Thus, taking into account the temporal context of a frame can boost overall confidence in any individual classification. Accordingly, for example, the system may generate a combined or averaged classification result comprising all preliminary classifications of an object, wherein each of the preliminary classifications is weighted based on its confidence score.

Figure 2D:
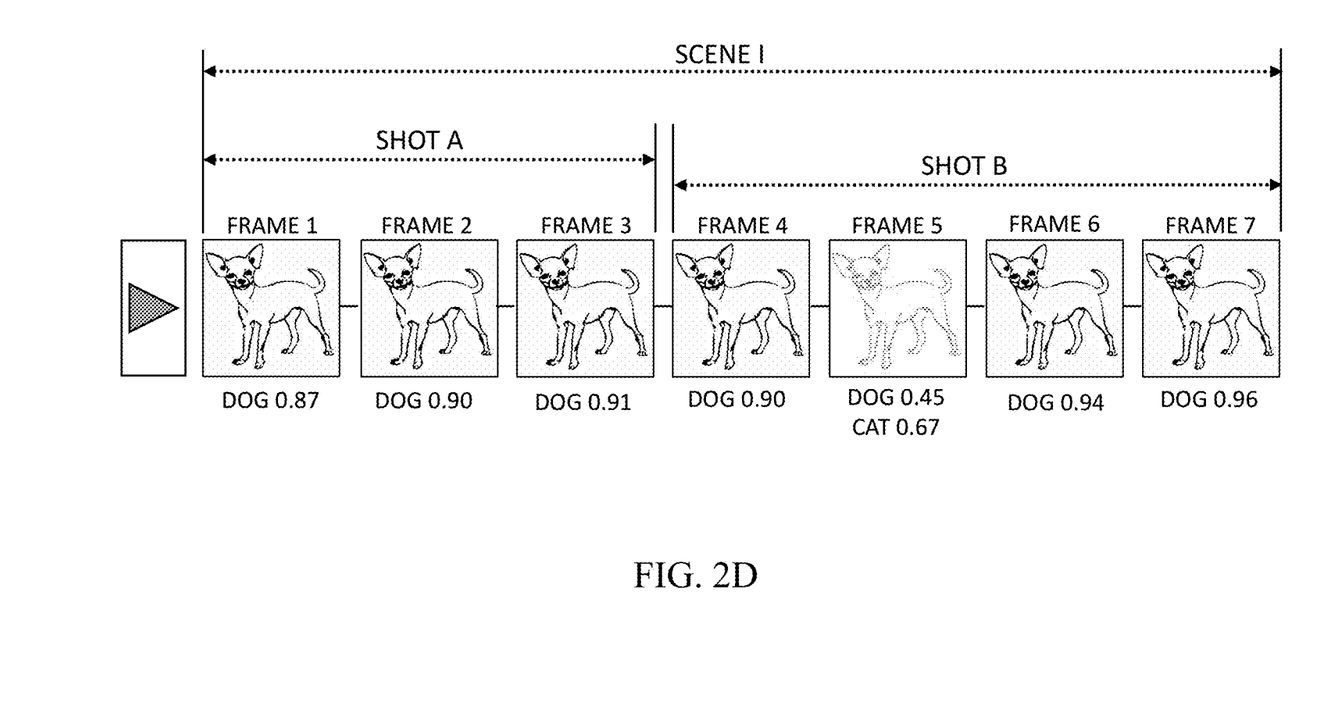
FIG. 2D illustrates the results of video object recognition, according to certain embodiments.

FIG. 2D is a schematic exemplary illustration of the process for pooling and averaging classification results across an entire scene. A video comprises a sequence of frames, each featuring an image of a dog. Based on a preliminary processing stage, the sequence may be segmented, e.g., into Shot A (comprising Frames 1-3) and Shot B (comprising Frames 4-7). Shots A and B together comprise Scene I of the video. For example, Scene I may comprise a single theme or storyline, shot in the same location and featuring the same objects. The building blocks of Scene I, Shots A, B, may feature the same location, objects, and general theme or storyline. However, Shots A, B may have been taken by one or more cameras from different angles. Accordingly, the images and features in Scene I are assumed to be correlated, and pooling the classification results across Frames 1-7 can help boost the overall classification performance of the system.

A visual classification application may then be applied to the video, e.g., the VR application, to generate a series of preliminary classifications. The results of the VR application show that the VR application has identified and preliminarily classified an object as a "dog" in Frames 1-4 and 6-7 with a fairly high level of confidence ranging from 0.87 to 0.96 (on a 0-1 scale). However, the VR application results show a lower level of confidence for Frame 5. Frame 5 may comprise the same object; however, the classification is inconclusive, e.g., owing to lighting conditions, shadow, camera angle, and/or other variables of the video. Accordingly, the VR application may classify the object in Frame 5 as a "cat" with a confidence levels of 0.67, and as a "dog" with considerably lower confidence level of 0.45.

When Frame 5 in FIG. 2D is considered in isolation, the classification output of the VR application is erroneous and of low confidence level. However, Frame 5 is part of a scene comprising multiple shots of the same object, all with more accurate classifications of the same object. Accordingly, the system may consider the temporal context of Frame 5, i.e., Scene I comprising Frames 1-4 and 6-7, and calculate a combined classification of all preliminary classifications in Scene I, as weighted based on the relative confidence scores of each frame. In this instance, a majority of the frames have been classified as "dog," whereas only a single frame has been classified as "cat." Moreover, the cumulative confidence score of the "dog" frames far outweigh the confidence level of the sole "cat" frame. Accordingly, at the end of this process, the combined classification may indicate that the object in the frames of Scene I is a "dog,", and accordingly, the system may override its previous classification of Frame 5, and reclassify the object as "dog," as the most probable classification based on the temporal evidence in the video.

In some embodiments, the system may apply, e.g., a Bayesian analysis to object classification, based on prior classifications identified within the same scene. For example, for each new classification in a frame, the system may take into account the prior probability calculated for temporally-precedent frames in the same shot or scene.

With continued reference to FIG. 2A, in some embodiments, the system of the present disclosure may use the results of the combined classification in step 210, to improve the segmentation of the video. In such embodiments, the classification results may be used to fine-tune video scene boundaries to obtain more correct video parsing. Accordingly, there may be performed alternating improvements in an iterative scheme, to arrive at an improved joint parsing of a video, and classification of objects therein.

In some embodiments, the object to be recognized in the video is text embedded in or superimposed on video frames. It will be appreciated that text in digital videos can provide important supplemental metadata, such as sports scores, product names, scene locations, speaker names, movie credits, program introductions, special announcements, etc. However, as noted above, text recognition in digital video presents several challenges compared with recognition from typical document images. First, video frames are typically limited in spatial resolution. Second, video text is usually embedded or overlaid in complex scenes or backgrounds. In addition, sometimes only parts of the frames have clear text, and sometimes only part of the text is readable or clear in these frames. Accordingly, as is the case with object recognition, text recognition based on single frame has its limitations.

In some embodiments, the present system may be utilized for temporally-based context-aware video text recognition. As with object recognition, this is based on the idea that shot boundaries may provide a good indication of the context in which similar text can be expected. Accordingly, it is readily appreciated that, for each occurrence of text in a video, the larger the number of frames containing the incident text, the better overall probability of accurately recognizing the text by pooling and averaging the results over multiple frames.

Figure 3A:
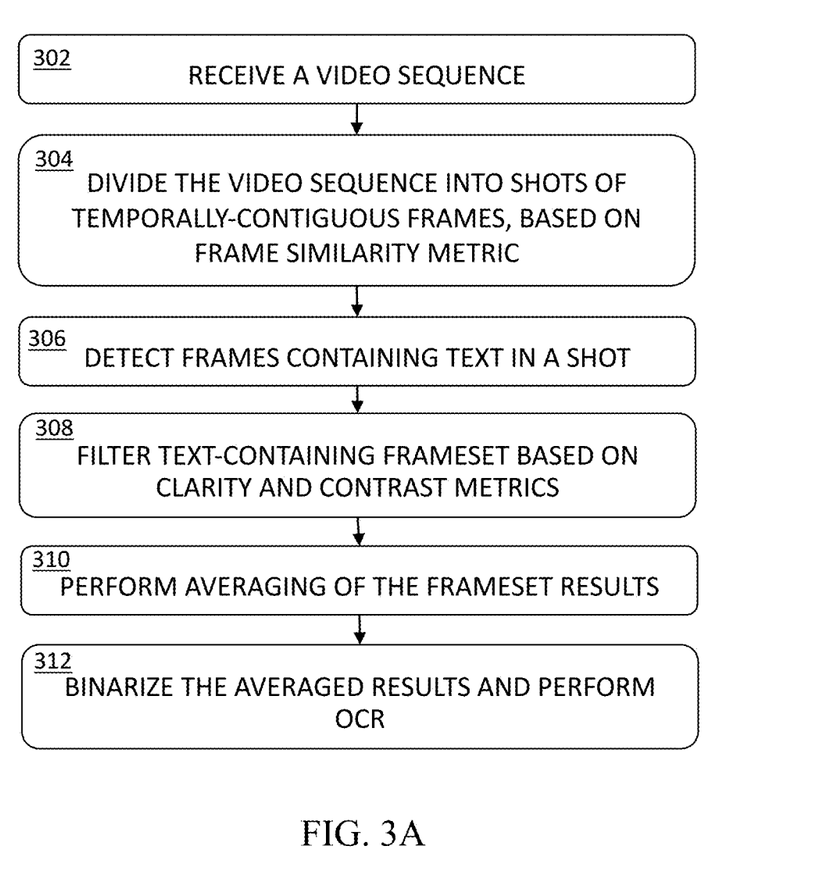
FIG. 3A shows a flowchart illustrating the functionality of a system and method for video text recognition, according to certain embodiments.

Reference is made to FIG. 3A, which is a flowchart illustrating certain embodiments of the present system and method. In a step 302, the system may receive a video sequence. In a step 304, the system may divide the video sequence into shots of temporally-contiguous frames, based on a frame similarity metric. In a following step 306, the system may identify those frames within the shot boundaries where text appears in the video (e.g., as a text box superimposed on the image). The system may proceed on the assumption that all occurrences of text in a single shot are identical. In a step 308, the system may select only those frames which present a suitable balance of clarity and contrast, to facilitate text recognition. In a step 310, the system averages the selected frameset. In some instances, the system may select parts, or 'blocks,' of frames with clearer text to construct multiple framesets, each containing different frames where various sections of the text are clearer. The system may then average the framesets block-by-block, and reconstruct the complete text string from the averaged blocks. In a step 312, the averaged results across the entire shot may be binarized, or rendered in black-and-white, and sent to an OCR module for text recognition.

Figure 3B:
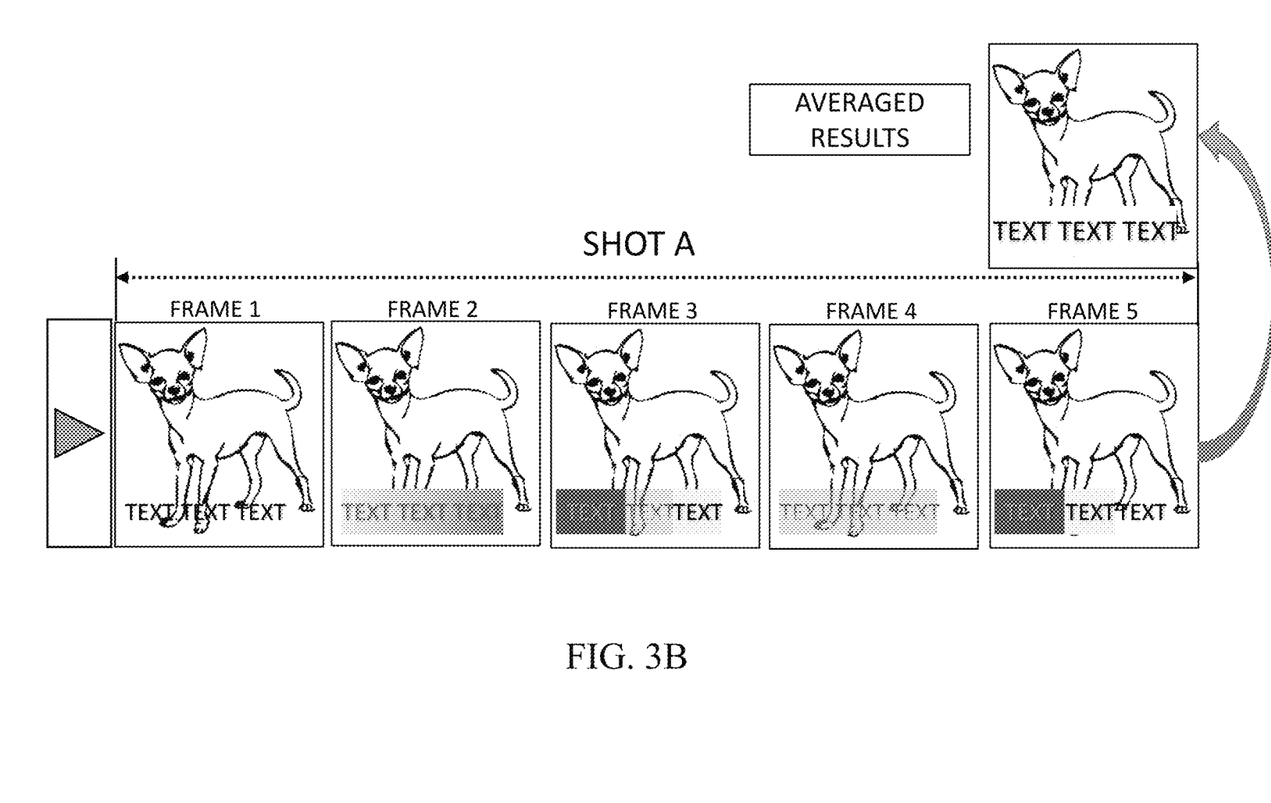
FIG. 3B illustrates the results of video text recognition, according to certain embodiments.

FIG. 3B shows a set of Frames 1-5 comprising Shot A, which contain a string of text in a text box. As can be seen, different frames provide varying levels of clarity, resolution, and contrast in the text box. By averaging results across all frames, the system may construct a text box with sufficient clarity and contrast to be suitable for OCR reading.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   (a) a non-transient computer-readable storage medium having stored thereon instructions to:
      receive a video sequence,
      divide the video sequence into one or more scenes based on scene boundaries, wherein each scene comprises a plurality of temporally-contiguous image frames, and wherein said scene boundaries are being determined based on a similarity metric between two temporally-contiguous image frames meeting a dissimilarity threshold, and
      for each scene of the one or more scenes:
         (i) generate a plurality of preliminary classifications of an object appearing in at least some of said image frames in the scene, wherein each of said plurality of preliminary classifications has a confidence score, and
         (ii) calculate a combined classification of the object based on said plurality of preliminary classifications, wherein each of said preliminary classifications is weighted in accordance with its confidence score; and
   (b) at least one hardware processor configured to execute the instructions.

2. The system of claim 1, wherein said instructions further comprise iteratively repeating the step of dividing of the video sequence into one or more scenes, wherein in a next iteration, the determining of scene boundaries is based, at least in part, on said combined classification.

3. The system of claim 1, wherein said scene boundaries are being determined, at least in part, based on one or more of: video metadata associated with the video sequence; a time range definition; textual information from the video sequence; audio content associated with the video sequence; and closed-captioning information associated with the video sequence.

4. The system of claim 1, wherein said instructions are further configured to execute facial recognition.

5. The system of claim 1, wherein said instructions are further configured to execute Optical Character Recognition (OCR).

6. The system of claim 1, wherein said classifications are executed by a neural network.

7. The system of claim 6, wherein said neural network is trained on a set of labelled image data to learn characteristics for each type of object.

8. A computer program product, the computer program product comprising a non-transitory computer-readable storage medium having program code embodied therewith, the program code executable by at least one hardware processor to:
   receive a video sequence;
   divide the video sequence into one or more scenes based on scene boundaries, wherein each scene comprises a plurality of temporally-contiguous image frames, and wherein said scene boundaries are being determined based on a similarity metric between two temporally-contiguous image frames meeting a dissimilarity threshold; and
   for each scene of the one or more scenes:
      (i) generate a plurality of preliminary classifications of an object appearing in at least some of said image frames in the scene, wherein each of said plurality of preliminary classifications has a confidence score, and
      (ii) calculate a combined classification of the object based on said plurality of preliminary classifications, wherein each of said preliminary classifications is weighted in accordance with its confidence score.

9. The computer program product of claim 8, further comprising iteratively repeating the step of dividing of the video sequence into one or more scenes, wherein in a next iteration, the determining of scene boundaries is based, at least in part, on said combined classification.

10. The computer program product of claim 8, wherein said scene boundaries are being determined at least in part based on one or more of: video metadata associated with the video sequence; a time range definition; textual information from the video sequence; audio content associated with the video sequence; and closed-captioning information associated with the video sequence.

11. The computer program product of claim 8, further comprising program code for executing facial recognition.

12. The computer program product of claim 8, further comprising program code for executing Optical Character Recognition (OCR).

13. The computer program product of claim 8, wherein said classifications are executed by a neural network.

14. The computer program product of claim 13, wherein said neural network is trained on a set of labelled image data to learn characteristics for each type of object.

15. A system comprising:
   (a) a non-transient computer-readable storage medium having stored thereon instructions to:
      receive a video sequence,
         (i) divide the video sequence into scenes based on scene boundaries, wherein each scene comprises a plurality of temporally-contiguous image frames, and wherein said scene boundaries are being determined based on a distance metric between two temporally-contiguous image frames, and
      with respect to each scene of the scenes:
         (ii) generate a plurality of preliminary classifications of an object appearing in at least some of said image frames in the scene, wherein each of said plurality of preliminary classifications has a confidence score, and (iii) calculate a combined classification of the object based on said plurality of preliminary classifications, wherein each of said preliminary classifications is weighted in accordance with its confidence score, and iteratively repeat steps (i) through (iii), wherein for a next iteration, said dividing is based, at least in part, on said calculated combined classification; and (b) at least one hardware processor configured to execute the instructions.

16. The system of claim 15, wherein said scene boundaries are being determined at least in part based on one or more of: video metadata associated with the video sequence; a time range definition; textual information from the video sequence; audio content associated with the video sequence; and closed-captioning information associated with the video sequence.

17. The system of claim 15, wherein said instructions are further configured to execute facial recognition.

18. The system of claim 15, wherein said instructions are further configured to execute Optical Character Recognition (OCR).

19. The system of claim 15, wherein said classifications are executed by a neural network.

20. The system of claim 19, wherein said neural network is trained on a set of labelled image data to learn characteristics for each type of object.

* * * * *